United States Patent
Potter

(10) Patent No.: US 7,439,743 B2
(45) Date of Patent: Oct. 21, 2008

(54) METHOD AND APPARATUS FOR ROCK SAMPLE ANALYSIS USING MAGNETIC SUSCEPTIBILITY

(75) Inventor: David Potter, Edinburgh (GB)

(73) Assignee: Heriot-Watt University, Edinburgh, Scotland (GB)

(*) Notice: Subject to any disclaimer, the term of this patent is extended or adjusted under 35 U.S.C. 154(b) by 0 days.

(21) Appl. No.: 11/431,767

(22) Filed: May 10, 2006

(65) Prior Publication Data

US 2007/0108982 A1    May 17, 2007

(51) Int. Cl.
*G01V 3/00* (2006.01)
(52) U.S. Cl. .................. 324/377; 324/201
(58) Field of Classification Search ......... 324/376–377, 324/201
See application file for complete search history.

(56) References Cited

U.S. PATENT DOCUMENTS

| 3,534,256 | A | * | 10/1970 | Johnson, Jr. ............ 324/201 |
| 3,882,375 | A |   | 5/1975  | Zemanek, Jr. |
| 4,507,613 | A | * | 3/1985  | Dion ..................... 324/340 |
| 4,641,099 | A | * | 2/1987  | Lee et al. ............... 324/323 |
| 4,729,960 | A |   | 3/1988  | Foote |
| 4,953,399 | A | * | 9/1990  | Fertl et al. ............. 73/152.02 |
| 5,012,674 | A | * | 5/1991  | Millheim et al. ....... 73/152.03 |
| 7,126,340 | B1 | * | 10/2006 | Ameen et al. .......... 324/377 |

FOREIGN PATENT DOCUMENTS

| DE | 10121137 | 10/2002 |
| FR | 2611054 | 8/1988 |
| WO | WO 2005/047933 | 5/2005 |

OTHER PUBLICATIONS

International Search Report dated Feb. 16, 2005.
*Magnetic Properties of Rocks and Minerals*, by Christopher P. Hunt, Bruce M. Moskowitz, and Sabir K. Banerjee, University of Minnesota, Institute for Rock Magnetism and Department of Geology and Geophysics, Copyright 1955 by the American Geophysical Union.

* cited by examiner

*Primary Examiner*—Jay M Patidar
(74) *Attorney, Agent, or Firm*—Young Basile

(57) ABSTRACT

A method for determining one or more parameters of a rock sample, comprising the steps of measuring the magnetic susceptibility of the sample, and determining a value of the parameter using that measured susceptibility. For example, the measured susceptibility can be used to determine fractional mineral content, permeability, cation exchange capability per unit pore volume, and flow zone indication.

31 Claims, 6 Drawing Sheets

| MINERAL TYPE | MINERAL | MAGNETIC SUSCEPTIBILITY PER UNIT MASS ($10^{-8}$ m$^3$ kg$^{-1}$) |
|---|---|---|
| Diamagnetic minerals: | Quartz | –0.5 to –0.6 |
|  | Calcite | –0.3 to –1.4 |
|  | Orthoclase feldspar | –0.49 to –0.67 |
| Paramagnetic minerals: | Illite | 15.0 |

| MINERAL TYPE | MINERAL | MAGNETIC SUSCEPTIBILITY PER UNIT MASS ($10^{-8}$ m$^3$ kg$^{-1}$) |
|---|---|---|
| Diamagnetic minerals: | Quartz | −0.5 to −0.6 |
| | Calcite | −0.3 to −1.4 |
| | Orthoclase feldspar | −0.49 to −0.67 |
| | | |
| Paramagnetic minerals: | Illite | 15.0 |

Figure 1

METHOD AND APPARATUS FOR ROCK SAMPLE ANALYSIS USING MAGNETIC SUSCEPTIBILITY

RELATED APPLICATION

This application claims priority to U.K. Patent Application No. 0326340.7 dated Nov. 12, 2003 and PCT Application No. PCT/GB2004/004750 dated Nov. 11, 2004.

FIELD OF THE INVENTION

The present invention relates to a method and tool for determining one or more petrophysical parameters from a measure of magnetic susceptibility. In particular, the invention relates to a method and tool for determining permeability from a measure of magnetic susceptibility.

BACKGROUND OF THE INVENTION

Magnetic susceptibility measurements are not routinely performed in the petroleum industry either in core analysis laboratories or downhole in wireline logging or measurements while drilling (MWD) operations. Permeability measurements are usually made directly on core samples. This direct measurement requires that the samples be cleaned and measured, which can take several days or weeks for all the core plugs from just one well. Since cutting and processing the core is very expensive, permeability measurements are generally only done on a fraction of the wells drilled. Whilst some techniques, such as nuclear magnetic resonance (NMR), have been used to predict permeability, these are relatively complicated and costly.

SUMMARY OF THE INVENTION

According to one aspect of the present invention there is provided a method for determining one or more parameters of a rock sample, the method involving measuring the magnetic susceptibility of the sample, and determining a value of the parameter using that measured susceptibility.

By using the measured magnetic susceptibility, the actual value of various parameters, such as permeability, can be obtained. This can be rapidly and effectively done by comparing the measured susceptibility (or a function thereof) with parameter values that are stored as a function of magnetic susceptibility (or a function thereof). To this end, the method in which the invention is embodied further involves storing parameter information as a function of magnetic susceptibility (or a function thereof) and using this to determine a parameter value for a sample. Preferably this is done for a range of different materials.

The parameter may be one or more of permeability (k), cation exchange capacity per unit pore volume (Qv), and flow zone indicator (FZI). The parameter may also be wireline gamma ray response. The invention resides at least in part in the previously unknown realisation that these parameters can be correlated with magnetic susceptibility (or a function thereof).

The method in which the invention is embodied is particularly useful for estimating permeability. Permeability is the ability of fluid to flow through rock, and is a key parameter in determining how best to access oil, as well as in determining where to drill in an oil or gas field. For the purposes of providing correlation data, permeability measurements can be gained using various sizes of rock samples, but preferably whole core rock samples, slabbed core rock samples or routine core plug samples.

Preferably, the method further involves characterising the sample to identify at least two components thereof or using a pre-determined characterisation of the sample; using the measured magnetic susceptibility and susceptibilities for the two identified components to determine the fraction of the total sample contributed by at least one of the components, and subsequently using the determined fraction to determine the value of the parameter. In this case, the stored correlation information would be a function of the fractional content.

Determining the fraction of the component in a total sample may be done using the equation: $F_B=(\chi_A-\chi_T)/(\chi_A-\chi_B)$, where A and B are the two components, $F_B$ is the fraction of component B and $\chi_A$, $\chi_B$, and $\chi_T$ are the magnetic susceptibilities of A, B and the total sample respectively.

The method can be applied to magnetic susceptibility measurements made in the laboratory on core samples (core plugs, slabbed core, whole core or even drill cuttings). The method can also be applied to downhole magnetic susceptibility data, thereby enabling in-situ estimates of mineral contents and petrophysical parameters to be made. This method can also be applied to current known downhole data activity (such as wireline gamma ray), thereby again enabling in-situ estimates of mineral contents and petrophysical parameters to be made. By correlating the magnetic susceptibility and/or the fractional content with various parameters, and in addition with the wireline gamma ray response, the method enables mineral content and consequent petrophysical parameter prediction information to be derived from the wireline gamma ray tool data. Hence, by comparing the measured magnetic susceptibility measurements from some representative core samples with the wireline gamma ray log data from the same oil or gas well, the mineral content and petrophysical parameters can be predicted throughout other large uncored intervals in the same well, and other wells in the same field, from the wireline gamma ray results.

According to another aspect of the present invention there is provided a computer program, preferably on a data carrier or computer readable medium, the program having code or instructions for receiving or accessing the measured magnetic susceptibility of the sample, and determining a value of the parameter using that measured susceptibility.

The parameters may include permeability (k), cation exchange capacity per unit pore volume (Qv), and flow zone indicator (FZI).

The code or instructions may be operable to access parameter information that is stored as a function of magnetic susceptibility (or a function thereof) and use this to determine a parameter value for a sample. Preferably this is done for a range of different materials.

Preferably, the computer program has code or instructions for receiving the identity of at least two components of the sample; identifying the magnetic susceptibility of the two identified components; and using the measured magnetic susceptibility and susceptibilities of the two identified components to determine the fraction of the total sample contributed by at least one of the components, wherein the code or instructions for determining the value of the parameter are operable to use the determined fraction to determine the value of the parameter.

The code or instructions for determining the fraction of a component in a total sample may be operable to use the equation: $F_B=(\chi_A-\chi_T)/(\chi_A-\chi_B)$, where A and B are the two components, $F_B$ is the fraction of component B and $\chi_A$, $\chi_B$, and $\chi_T$ are the magnetic susceptibilities of A, B and the total sample respectively.

The code or instructions may be operable to compare the determined fractional content of one of the components with pre-determined data, the pre-determined data being a measure of one or more parameters as a function of fractional content of said component, thereby to determine a value for that parameter for the component. The parameters may be any one or more of permeability, cation exchange capacity per unit pore volume (Qv), and flow zone indicator (FZI).

According to yet another aspect of the present invention there is provided a system for determining one or more parameters of a rock sample, the system being operable to receive or access a measured value of magnetic susceptibility of a sample, and determine a value of the parameter using that measured susceptibility.

The parameters may include permeability (k), cation exchange capacity per unit pore volume (Qv), and flow zone indicator (FZI).

The system may be operable to access parameter information that is stored as a function of magnetic susceptibility (or a function thereof) and use this to determine a parameter value for a sample. Preferably this is done for a range of different materials.

Preferably, the system is operable to receive the identity of at least two components of the sample; identify the magnetic susceptibility of the two identified components; use the measured magnetic susceptibility and susceptibilities of the two identified components to determine the fraction of the total sample contributed by at least one of the components, and subsequently determine the value of the parameter using the determined fraction.

The system may be operable to determine the fraction of the total sample using the equation: $F_B=(\chi_A-\chi_T)/(\chi_A-\chi_B)$, where A and B are the two components, $F_B$ is the fraction of component B, and $\chi_A$, $\chi_B$, and $\chi_T$ are the magnetic susceptibilities of A, B and the total sample respectively.

The system may include means for comparing the fractional content of one of the components with pre-determined data, the pre-determined data being a measure of one or more parameters as a function of fractional content of said component, thereby to determine a value for that parameter for that component of the sample. The parameters may be any one or more of permeability, cation exchange capacity per unit pore volume (Qv), and flow zone indicator (FZI).

Means may be provided for measuring the magnetic susceptibility of the sample and providing the measured value to the means for determining. The means for measuring the magnetic susceptibility of the sample may be a laboratory tool or a downwell/downhole tool.

The system may include a memory for storing the magnetic susceptibilities of the sample, and the two components. Alternatively or additionally the system may include a user input for inputting data. Alternatively or additionally the system may include a user display for displaying determined information.

According to still another aspect of the present invention there is provided a tool for determining one or more parameters of a rock sample, the tool being operable to measure the magnetic susceptibility of a sample, and determine a value of the parameter using that measured susceptibility. The parameters may include permeability (k), cation exchange capacity per unit pore volume (Qv), and flow zone indicator (FZI) as a function of the fractional content of a known component. The tool may be operable to access parameter information that is stored as a function of magnetic susceptibility (or a function thereof) and use this to determine a parameter value for a sample. Preferably this is done for a range of different materials.

According to a still further aspect of the invention, there is provided a method for determining a parameter value involving measuring magnetic susceptibility and measuring or determining a plurality of parameters; storing data correlating the measured susceptibility or a function thereof for each parameter; measuring one of the parameters and inferring values for one or more of the other parameters using the correlated data and said measured parameter. The plurality of parameters may include permeability, cation exchange capacity per unit pore volume (Qv), flow zone indicator (FZI) and wireline gamma ray response. Measuring said one parameter may involve measuring the wireline gamma ray response and inferring values for one or more of the other parameters using the correlated data.

BRIEF DESCRIPTION OF THE DRAWINGS

Various aspects of the invention will now be described by way of example only and with reference to the accompanying drawings, of which:

FIG. 1 is a table showing the magnetic susceptibility for various minerals;

DETAILED DESCRIPTION OF THE DRAWINGS

Figure 2:
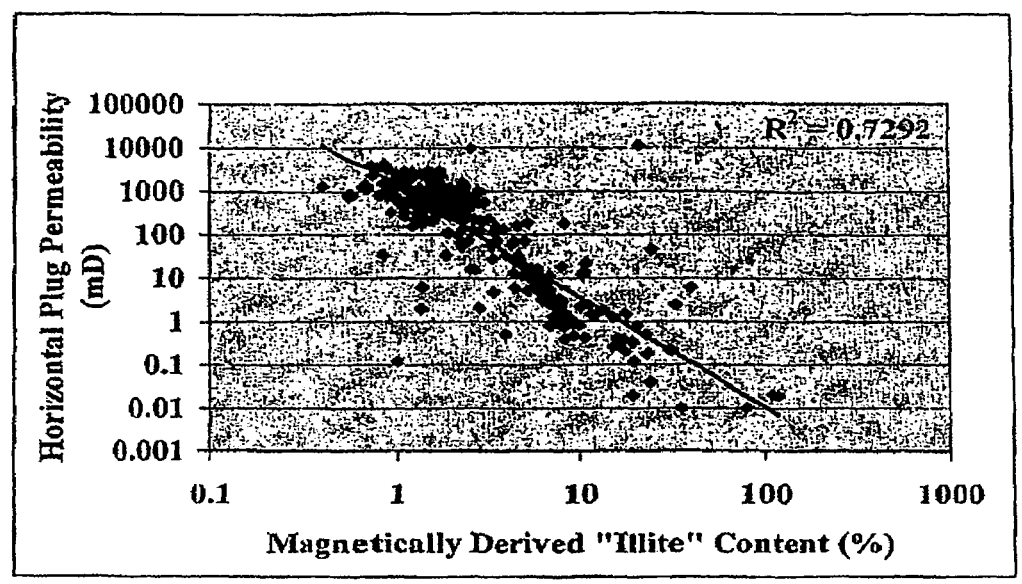
FIG. 2 is a plot of horizontal plug permeability versus magnetically derived illite content.

The method in which the invention is embodied involves measuring the magnetic susceptibility of a sample, and determining a value of a petrophysical parameter, such as permeability, using that measured susceptibility. This can be done either by correlating the raw measured susceptibility data with parameter data that is stored as a function of the susceptibility or by processing that magnetic susceptibility data and then comparing it with parameter data that is stored as a function of the processed data. For example, the processed data could be the fraction of the total sample contributed by at least one of the components. This will be described in more detail later. In either case, the methodology can be implemented in software or hardware or a combination of these.

The measured raw magnetic susceptibility of a rock core sample represents the combined signal from all the negative susceptibility (diamagnetic) and positive susceptibility (for example paramagnetic or ferrimagnetic) mineral components in the rock. This means that rock samples can have a net positive or negative magnetic susceptibility dependent upon their composition. Raw magnetic susceptibility can be measured on core plugs, and additionally drill cuttings, whole core or slabbed core, and so there is no need to cut core plugs. This is particularly useful for unconsolidated core, where it is often difficult or impossible to cut coherent plugs. Any technique for measuring magnetic susceptibility could be used.

To use magnetic susceptibility information to determine the fractional composition of a sample, it is firstly assumed that the sample consists of a simple two component mixture comprising mineral A with intrinsic negative magnetic susceptibility (diamagnetic) together with mineral B with intrinsic positive magnetic susceptibility (paramagnetic, or ferrimagnetic, or ferromagnetic, or antiferrimagnetic), both of which susceptibilities are known. In practice, the most appropriate choice of minerals A and B for a given section of an oil or gas well can be made by initially characterising drill cuttings, and identifying the matrix mineralogy using known methods such as crossplotting different wireline log results on known templates.

For a two component sample, the total magnetic susceptibility signal per unit mass (or volume), $\chi_T$, is the sum of the two components:

$$\chi_T = \{(F_B)(\chi_B)\} + \{(F_A)(\chi_A)\} \tag{1}$$

or alternatively, $$hd \chi_T = \{(F_B)(\chi_B)\} + \{(1-F_B)(\chi_A)\} \tag{2}$$

where $F_A$ is the fraction of mineral A, $F_B$ is the fraction of mineral B, and $\chi_A$ and $\chi_B$ are the known magnetic susceptibilities per unit mass (or volume) of minerals A and B. Since $\chi_T$ is the measured magnetic susceptibility of the rock sample, and $\chi_A$ and $\chi_B$ are known then the fraction of mineral B is given by:

$$F_B = (\chi_A - \chi_T)/(\chi_A - \chi_B) \tag{3}$$

It is then a simple matter to also obtain the fraction of mineral A as follows:

$$F_A = 1 - F_B \tag{4}$$

By multiplying these fractions by 100% the percentages of the minerals A and B in the rock sample can be obtained.

Converting a raw magnetic susceptibility signal into a mineral percentage (i.e. processing it to a positive number) has certain advantages. Firstly, intervals of bore samples containing anomalous mineralogy can rapidly be pin-pointed. This can be done by looking at the magnetic susceptibility as a function of depth down the bore sample and identifying any peaks or troughs. A value of greater than 100% for one or the components (particularly component B) clearly indicates that other minerals are present. Secondly, comparisons of this magnetically derived mineral content can be made with pre-determined data on logarithmic plots, the pre-determined data being a measure of one or more petrophysical parameters as a function of the fractional content. In this way, a value for that parameter can be determined for that component of the sample. Examples of parameters that can be determined in this way include permeability, cation exchange capacity per unit pore volume (Qv), and flow zone indicator (FZI). This will be described in more detail later, with reference to specific samples.

The major constituents of most sedimentary rocks, usually quartz in the case of sandstones or calcite in the case of carbonates, are diamagnetic and have low negative magnetic susceptibility values. In contrast the important permeability controlling clay minerals, for example illite, are paramagnetic with significantly higher positive magnetic susceptibilities. Hence, in many cases, determining the permeability of, for example, illite, allows the overall sample permeability to be determined. The susceptibilities for various common materials are shown in FIG. 1. This data is derived from Hunt, C. P., Moskowitz, B. M., and Banerjee, S. K., 1995, Magnetic properties of rocks and minerals, in Ahrens, T. J., ed., Rock Physics and Phase Relations: a Handbook of Physical Constants: American Geophysical Union reference shelf 3, p. 189-204. In many sedimentary sequences, for example North Sea reservoir shoreface facies, quartz and paramagnetic clays (generally illite or chlorite) are the dominant carriers of the magnetic susceptibility signal in the absence of a significant fraction of other paramagnetic or ferrimagnetic minerals. Assuming that the rock in these sequences is a simple mixture of quartz (the diamagnetic component) and illite (the paramagnetic component) then the total magnetic susceptibility signal of the rock sample per unit mass, $\chi_T$, is the sum of the two components:

$$\chi_T = \{(F_I)(\chi_I)\} + \{(1-F_I)(\chi_Q)\} \tag{5}$$

where $F_I$ is the fraction of illite, $(1-F_I)$ is the fraction of quartz, and $\chi_I$ and $\chi_Q$ are the generally known magnetic susceptibilities per unit mass (or volume) of illite and quartz. Since $\chi_T$ can be measured (rapidly, for example, using a magnetic susceptibility bridge) and $\chi_I$ and $\chi_Q$ are known then the fraction of illite, $F_I$, is given by:

$$F_I = (\chi_Q - \chi_T)/(\chi_Q - \chi_I) \tag{6}$$

It is then a simple matter to also obtain the fraction of quartz $(1-F_I)$. Thus an upper limit to the amount of illite $(F_I)$ can be rapidly obtained, since it is assumed in this analysis that the positive component of the total magnetic susceptibility signal is due entirely to illite. Using this information, petrophysical parameters can be determined by reference to stored pre-determined data, the pre-determined data being a measure of one or more parameters as a function of fractional content of illite.

Figure 3:
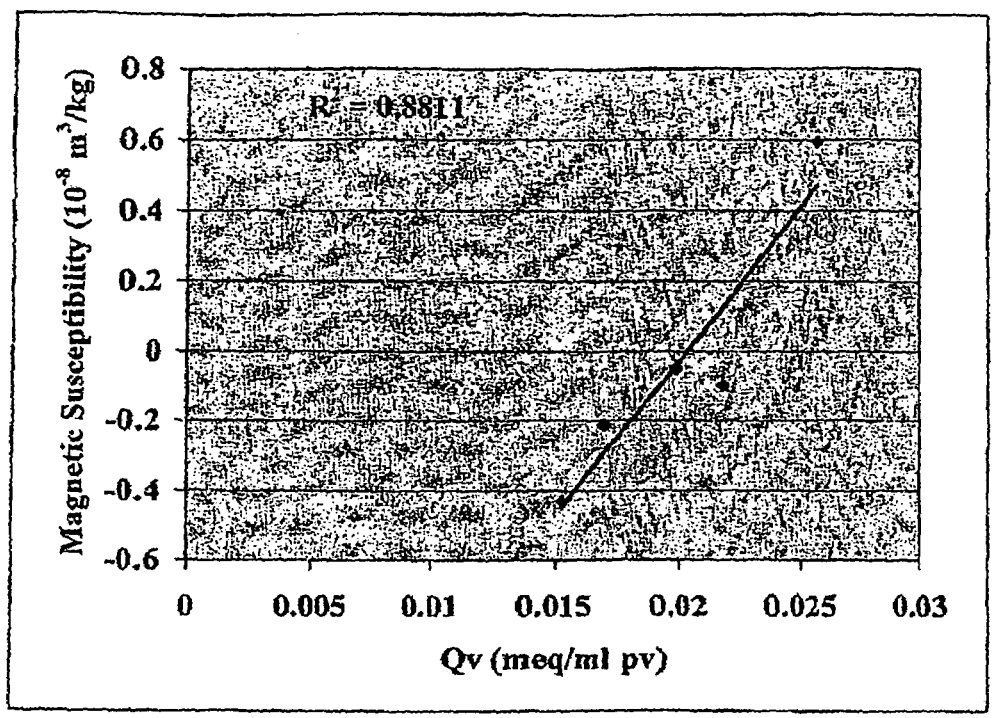
FIG. 3 is a plot of magnetic susceptibility versus cation exchange capacity per unit pore volume ($Q_V$)
Figure 4:
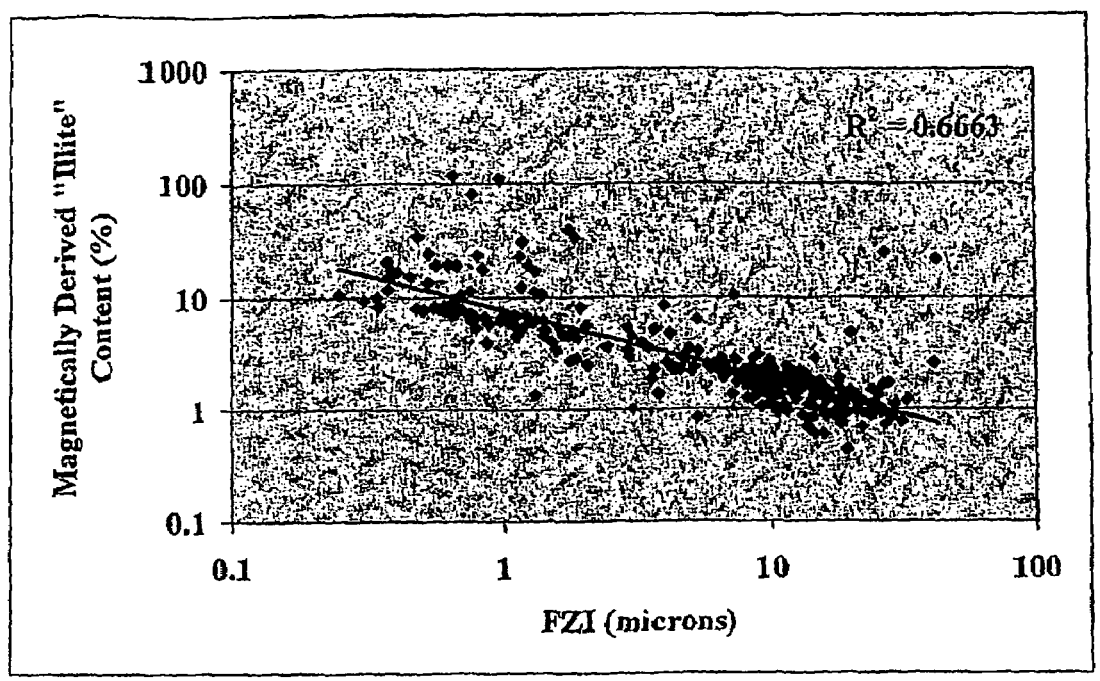
FIG. 4 is a plot of versus magnetically derived illite content versus flow zone indicator (FZI)

Various stored logarithmic crossplots are shown in FIGS. 2 to 4. These are pre-determined and are used to correlate measured magnetic susceptibility, or a function thereof such as fractional mineral content, with specific parameter values. For example, FIGS. 2 and 4, show that magnetically derived illite content exhibits strong experimental correlations with fluid permeability (k), and the flow zone indicator (FZI). Thus merely by determining the percentage content of the illite, these parameters can be rapidly inferred or predicted. For some parameters it is not necessary to determine the fractional content of the material, but instead the raw measured susceptibility data can be used. For example, as shown in FIG. 3, the cation exchange capacity per unit pore volume (Qv) demonstrates a strong correlation with raw measured magnetic susceptibility. Hence, an estimate of this parameter can be rapidly inferred merely from a measure of the magnetic susceptibility.

In many cases a simple two-component model mixture is a good approximation, as in the example above for typical North Sea reservoir rock samples. However, many rock samples consist of three or more components. In these cases, if it is possible to estimate the content of the other components from some representative X-ray diffraction (XRD) or thin section analysis, then the magnetic method disclosed herein could be used to rapidly estimate the one or two components of interest in other large intervals/samples, where the other analyses would be too time consuming or expensive.

If the component mineral B of interest is a paramagnetic mineral (such as a permeability controlling clay) and other ferrimagnetic (or ferromagnetic or antiferrimagnetic) minerals are present, then $F_B$ will be overestimated unless these other components are taken into account. However, the presence of these other (remanence carrying) components can easily be identified by seeing whether the sample can acquire a laboratory induced remanence. This is most easily done by subjecting the rock sample to a pulsed magnetic field. Any ferrimagnetic (or ferromagnetic or antiferrimagnetic) mineral present will acquire an isothermal remanent magnetisation (IRM) under these conditions, which can be measured using known magnetometer technology. The only exception to this is superparamagnetic particles, which will not acquire a remanence.

In cases where the rock consists of two or more diamagnetic minerals (for example quartz and orthoclase feldspar)

plus one paramagnetic mineral (for example, illite), then the magnetic estimates of the content of the paramagnetic mineral ($F_B$) will not be significantly affected by the assumption in equations (1) and (2) that the total diamagnetic signal in the rock is due to entirely to the one assumed diamagnetic mineral, since many diamagnetic minerals, for example calcite and orthoclase feldspar (see FIG. 1) have very similar magnetic susceptibility values to that of quartz.

Figure 5:
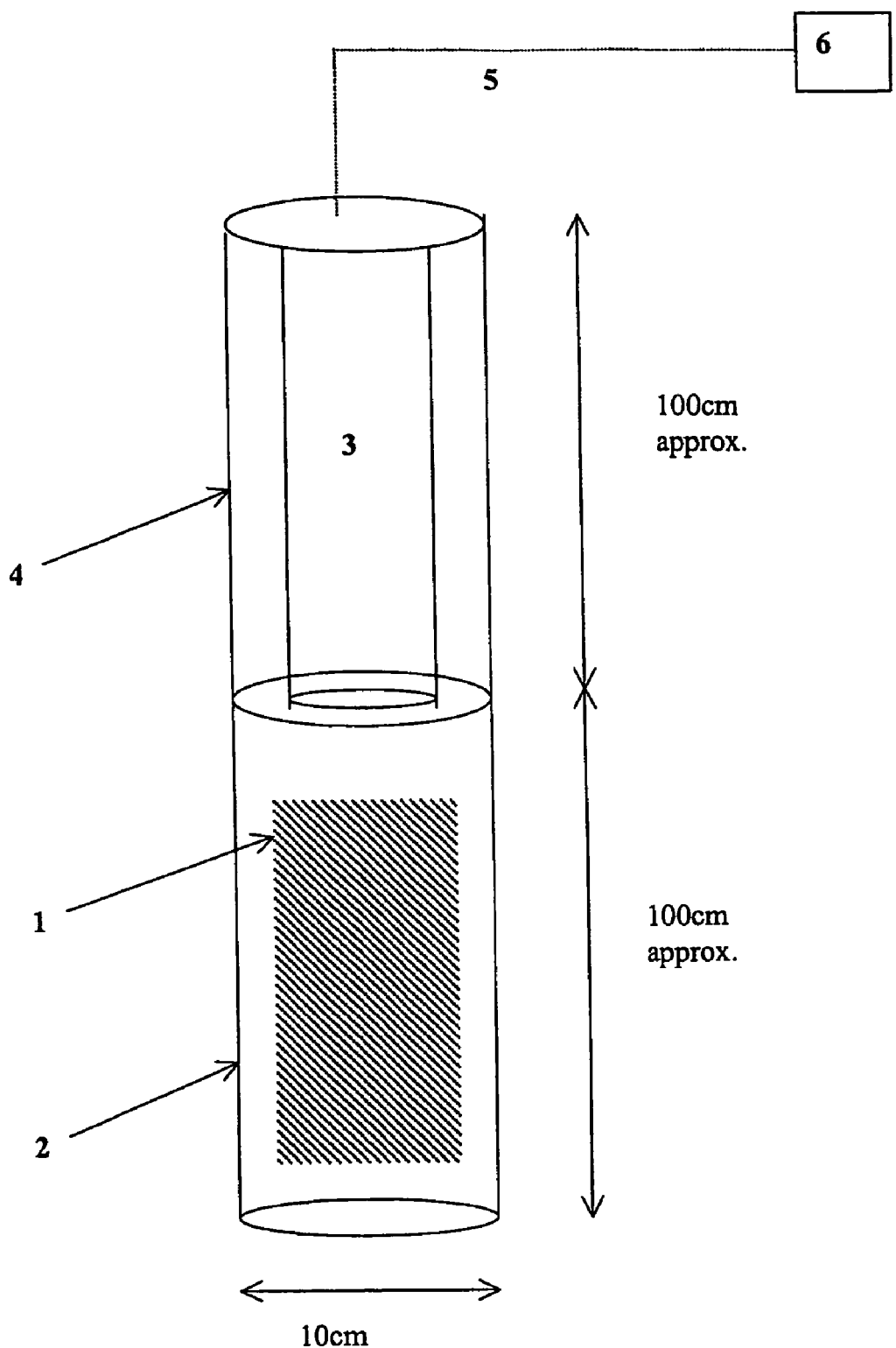
FIG. 5 is a block diagram of a downhole tool.

FIG. 5 shows a downwell tool. This has a magnetic sensor 1 in the form of a coil or coils (preferably a dual coil system). This is positioned in a strong cylindrical non-magnetic housing 2. This housing has a diameter appropriate for typical borehole diameters as used in the oil and gas industry (around 10 cm, but could be smaller or larger depending on the size of the borehole). The length of the cylinder is around 1 m. Above the sensor housing is a cylindrical enclosure containing electronics 3 that process the signal from the sensor coil system. This enclosure is also around 1 m in length, but is of a smaller diameter than the sensor housing. Surrounding the electronics enclosure is an outer cylinder 4 suitable for protecting the electronic enclosure at reservoir temperatures and pressures. Above the electronic enclosure is a wire output housed in a cable 5 suitable for wireline logging operations. Using the magnetic sensor 1, it is possible to obtain a direct measure of the susceptibility of the material in the vicinity of the tool and outside the housing 2. This data output is relayed, via wires in the cable, to a surface recording facility 6. Typically, the surface equipment includes a memory (not shown) for storing the magnetic susceptibilities of the sample, and the two components, and parameter correlation data/plots. The system includes a user input for inputting data and a user display for displaying determined information.

Using the tool of FIG. 5 enables downhole in-situ measurements of magnetic susceptibility as part of a wireline logging string. The tool would operate at oil or gas reservoir temperatures (up to at least 120° C.) and pressures of around 6000-10000 psi (about 40-70 MPa). The tool might also be incorporated in another form of downhole measurements, these being measurements while drilling (MWD).

Downhole measurements of raw magnetic susceptibility can potentially indicate the main lithological zonations in a borehole at high resolution. This is because a net negative magnetic susceptibility signal indicates that the rock has predominantly diamagnetic minerals (e.g., quartz), whereas a net positive magnetic susceptibility signal indicates that the rock h as significant quantities of minerals with positive susceptibility. A change from a positive to a negative susceptibility indicates a change of material and so a new lithological zone. The materials might be paramagnetic (e.g., illite clay), ferrimagnetic (e.g., magnetite), or anti-ferrimagnetic (e.g., hematite). These susceptibility zonations may also correlate with the broad permeability zonations downhole. Generally, the negative magnetic susceptibility zones correspond to high permeability zones (except where there are low permeability diamagnetic cements), and the positive magnetic susceptibility zones tend to correspond to low permeability zones. Using magnetic susceptibility measurements, the cut-offs between the different lithologies can be quantitatively more accurate than a gamma ray tool, due to the higher potential resolution of the magnetic tool.

Figure 6:
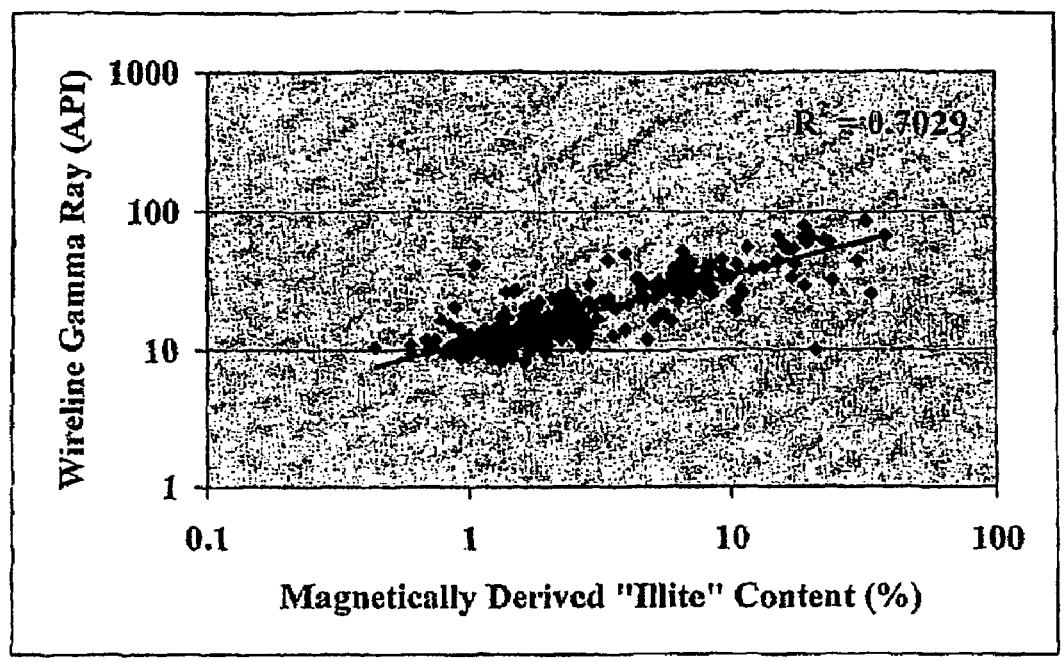
FIG. 6 is plot of wireline gamma ray versus magnetically derived illite content.

The methodology in which the invention is embodied provides a mechanism for determining the fractional content of two component samples (one component having a negative magnetic susceptibility and the other component having a positive susceptibility), merely from a measure of magnetic susceptibility. Also, it can be used to provide information on any parameter that has a direct correlation with magnetic susceptibility, for example mineral contents and petrophysical parameters as listed above. In addition, it has been found that fractional content data derived from measured magnetic susceptibility can be correlated with wireline gamma ray data. For example, the magnetically derived illite content from the core material in some North Sea oil wells has shown a strong experimental correlation with the wireline gamma ray results as illustrated in FIG. 6. Hence, by measuring the magnetic susceptibility and the wireline gamma ray response for a range of samples having different fractional contents of a material, for example illite, generating fractional content information and storing this as a function of the wireline gamma ray data, the fractional illite content can be quantified from the gamma ray results in other sections of the same well or adjacent wells where there is no core. Since the illite content in this case correlates with the gamma ray results, it is also very likely to correlate with the permeability, the cation exchange capacity per unit pore volume, and the flow zone indicator, as has been discovered experimentally in other cases. Thus all these parameters can again be predicted from the wireline gamma ray data.

The present invention provides numerous advantages. For example, compared to the known laboratory core gamma ray method, the method as applied in the laboratory disclosed herein enables a higher resolution of measurement. Compared to known laboratory nuclear magnetic resonance (NMR) measurements, the method disclosed herein is substantially quicker, requires no sample preparation, and correlates better with the actual permeability of the rock in samples where this comparison has been made. This means that the measurement and processing of several hundred conventional core plugs (equivalent to all the core plugs from one or two oil or gas wells) could be done in one day, allowing estimates of the permeability to be made on the same day. Hence, key exploration and drilling decisions can be made at a much earlier stage than is currently possible. In addition, measurements can be made on drill cuttings, which are a cheap and rapid source of core material. A further useful feature is that the invention can also quantify the effect of cleaning on the sample, for example the effect of the removal of clays. This is because measurements can be taken and data interpreted both before and after cleaning for comparison purposes. Also, the method is non-destructive and environmentally friendly, and therefore has positive benefits as regards sustainability issues. Additionally, it can be applied to downhole magnetic susceptibility data, which allows magnetically derived mineral contents, and petrophysical parameters (permeability, k, the cation exchange capacity per unit pore volume, Qv, and the flow zone indicator, FZI) to be estimated for in-situ measurements at reservoir temperatures and pressures.

A skilled person will appreciate that variations of the disclosed arrangements are possible without departing from the invention. For example, although the invention has been described primarily with reference to an oil or gas well, it will be appreciated that it could be applied to any sample from any borehole. Also, although the invention is described primarily with reference to a sample including illite, it can be applied to many rock types, such as sandstones comprising a dominant diamagnetic mineral (for example quartz) and a paramagnetic mineral (for example chlorite), or carbonates comprising a diamagnetic mineral (for example calcite) and a ferrimagnetic mineral (for example magnetite). Other components may correlate in a different way with petrophysical parameters, but the correlation data for other component minerals could potentially be used for predicting these parameters. Accordingly, the above description of a specific embodiment is made by way of example only and not for the purposes of limitations. It will be clear to the skilled person that minor modifications may be made without significant changes to the operation described.

What is claimed is:

1. A method for determining one or more parameters of a rock sample, the method including steps of measuring the magnetic susceptibility of the sample, and determining a value of the parameter using that measured susceptibility by storing pre-determined parameter information as a function of magnetic susceptibility or a function thereof and using this to determine a parameter value for a sample based on the measured magnetic susceptibility.

2. A method as claimed in claim 1 wherein the parameters include fractional mineral content, permeability (k), cation exchange capacity per unit pore volume (Qv), and flow zone indicator (FZI).

3. A method as defined in claim 2 wherein measuring the magnetic susceptibility is done in a laboratory or downwell.

4. A method as defined in claim 3 wherein measuring the magnetic susceptibility is done downwell, while drilling, thereby to provide measurements while drilling (MWD).

5. The method of claim 3 wherein the downwell measurement is done by wireline or measurements while drilling (MWD).

6. A method for determining at least one parameter of a rock sample, the method including the steps of measuring the magnetic susceptibility of the sample, and determining a value of the parameter using that measured susceptibility by characterizing the sample to identify at least two components thereof or using a pre-determined characterization of the sample; using the measured magnetic susceptibility and susceptibilities for the two identified components to determine the fraction of the total sample contributed by at least one of the components, and subsequently using the determined fraction to determine the value of the parameter.

7. A method as defined in claim 6 wherein determining the fraction of the component in a total sample involves using the equation: $F_B = (x_A - x_T)/(x_A - x_B)$, where A and B are the two components, $F_B$ is the fraction of component B and $x_a$, $x_B$ and $x_T$ are the magnetic susceptibilities of A, B and the total sample respectively.

8. The method of claim 7 further comprising determining the fraction of component A, $F_A$, using: $F_A = 1 - F_B$.

9. A computer program on an electronically-readable medium, the program having instructions for determining one or more parameters of a rock sample using measured magnetic susceptibility of a rock sample, and determining a value of the parameter using that measured susceptibility and parameter information stored as a function of magnetic susceptibility or a function thereof.

10. A computer program as claimed in claim 9 wherein the parameters include permeability (k), cation exchange capacity per unit pore volume (Qv), and flow zone indicator (FZI) as a function of the fractional content of a known component.

11. A computer program on computer readable storage medium readable medium, for determining one or more parameters of a rock sample, the program having code or instructions for using measured magnetic susceptibility of the sample and the magnetic susceptibilities of two components of the sample to determine the fraction of the total sample contributed by at least one of the components, wherein the code or instructions for determining the value of the parameter are operable to use the determined fraction to determine the value of the parameter.

12. A computer program as claimed in claim 11 wherein the code or instructions for determining the fraction of a component in a total sample is operable to use the equation: $F_B = (x_A - x_T)/(x_A - x_B)$, where A and B are the two components, $F_B$ is the fraction of component B and $x_a$, $x_B$, and $x_T$ are the magnetic susceptibilities of A, B and the total sample respectively.

13. A computer program as claimed in claim 11 wherein the code or instructions compare the determined fractional content of one of the components with pre-determined data, the pre-determined data being a measure of one or more parameters as a function of fractional content of said component, thereby to determine a value for that parameter for the component.

14. A computer program as claimed in claim 13 wherein the parameters are any one or more of permeability, cation exchange capacity per unit pore volume (Qv), and flow zone indicator (FZI).

15. A system for determining one or more parameters of a rock sample, the system being operable to receive or access a measured value of magnetic susceptibility of a sample, use parameter information that is stored as a function of magnetic susceptibility or a function thereof and use this to determine a parameter value for a sample.

16. A system as claimed in claim 14 wherein the parameters is any one or more of permeability (k), cation exchange capacity per unit pore volume (Qv), and flow zone indicator (FZI).

17. A system as claimed in claim 16 that is operable to determine the fraction of the total sample using the equation: $F_B = (x_A - x_T)/(x_A - x_B)$, where A and B are the two components, $F_B$ is the fraction of component B, and $x_a$, $x_B$, and $x_T$ are the magnetic susceptibilities of A, B and the total sample respectively.

18. A system as claimed in claim 16 including a memory for storing the magnetic susceptibilities of the sample, and the two components.

19. A system as claimed in claim 16 including a user input for inputting data.

20. A system as claimed in claim 16 including a user display for displaying determined information.

21. A system as claimed in claim 19 wherein the plurality of parameters includes permeability (k), cation exchange capacity per unit pore volume (Qv), flow zone indicator (FZI) and wireline gamma ray response.

22. A method as claimed in claim 20 measuring said one parameter involves measuring the wireline gamma ray response and inferring values for one or more of the other parameters using the correlated data.

23. A system as claimed in claim 16 that is operable to determine the fraction of the total sample using the equation: $F_B = (x_A - x_T)/(x_A - x_B)$, where A and B are the two components, $F_B$ is the fraction of component B, and $x_a$, $x_B$, and $x_T$ are the magnetic susceptibilities of A, B and the total sample respectively.

24. A system for determining one or more parameters of a rock sample, the system is operable to use a measured value of magnetic susceptibility of a rock sample, and determine a value of the parameter using that measured susceptibility using the measured magnetic susceptibility and the magnetic susceptibilities of two components of the sample to determine the fraction of the total sample contributed by at least one of the components, and subsequently determine the value of the parameter using the determined fraction.

25. A system as claimed in claim 24 or claim 17 operable to compare the fractional content of one of the components with pre-determined data, the pre-determined data being a measure of one or more parameters as a function of fractional content of said component, thereby to determine a value for that parameter for that component of the sample.

26. A system as claimed in claim 24 including means for measuring the magnetic susceptibility of the sample and providing the measured value to the means for determining.

27. A system as claimed in claim 26 wherein the means for measuring the magnetic susceptibility of the sample is downwell/downhole tool.

28. A system as claimed in claim 24 wherein the downwell/downhole tool is operable to make wireline measurements or measurements while drilling.

29. A method for determining a parameter value involving measuring magnetic susceptibility of a rock sample and measuring or determining a plurality of parameters; storing data correlating the measured susceptibility or a function thereof for each parameter; measuring one of the parameters and inferring values for one or more of the other parameters using the correlated data and said measured parameter.

30. A method for determining at least one parameter of a rock sample, the method including steps of measuring the magnetic susceptibility of the sample, and determining a value of the parameter using that measured susceptibility, wherein the parameter is at least one of fractional mineral content, permeability (k), cation exchange capacity per unit pore volume (Ov), and flow zone indicator (FZI).

31. A computer program as claimed in claim 9 wherein the code or instructions for determining the fraction of a component in a total sample is operable to use the equation: $F_B = (\chi_A - \chi_T)/(\chi_A - \chi_B)$, where A and B are the two components, $F_B$ is the fraction of component B and $\chi_a$, $\chi_B$, and $\chi_T$ are the magnetic susceptibilities of A, B and the total sample respectively.

* * * * *